Oct. 25, 1932.  A. W. ROCKWOOD  1,884,254
PIPING, WELTING, OR THE LIKE AND PROCESS OF MAKING SAME
Filed Oct. 31, 1930
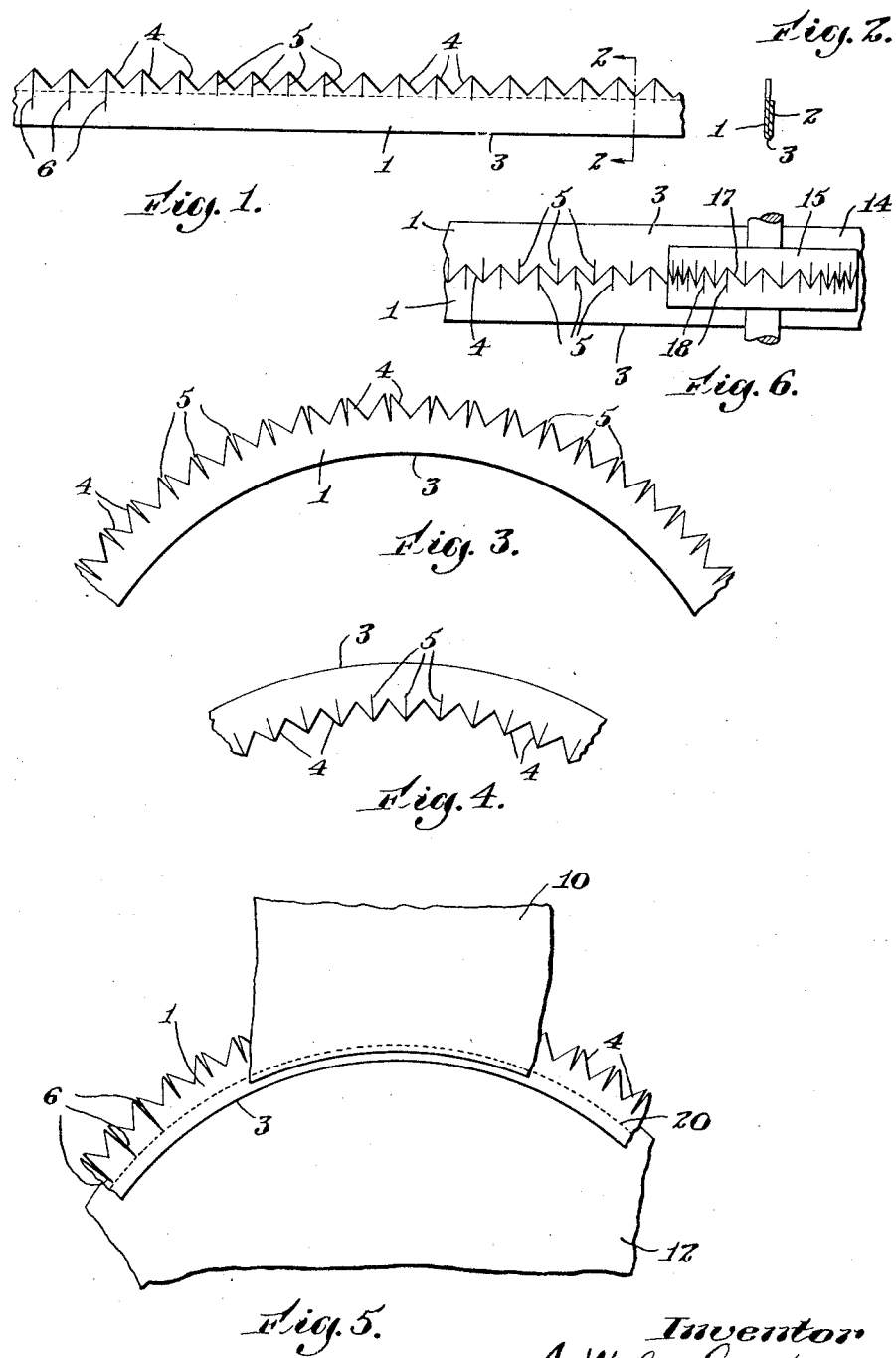
Inventor
A. Waldo Rockwood
by James R. Hodder
Attorney Patented Oct. 25, 1932

1,884,254

UNITED STATES PATENT OFFICE

A. WALDO ROCKWOOD, OF WINCHESTER, MASSACHUSETTS, ASSIGNOR TO HALEY-CATE-ROCKWOOD COMPANY, OF EVERETT, MASSACHUSETTS, A CORPORATION OF MASSACHUSETTS

PIPING, WELTING, OR THE LIKE AND PROCESS OF MAKING SAME

Application filed October 31, 1930. Serial No. 492,519.

My present invention is a novel and improved piping or welting, and is particularly intended for use in the manufacture of boots and shoes, automobile trimming, furniture upholstery or the like.

In the use of piping, welting or the like, it is necessary to have the same sufficiently flexible to fit snugly and smoothly around curved portions of the article to which it is attached, or between which it may be applied. Thus in the manufacture of boots and shoes, a piping is frequently fitted between parts of the upper, such as the vamp and quarters, and must be capable of being bent around contours of the same. Similarly, in furniture and automobile upholstery, the piping strip must be capable of being fitted around relatively sharp corners, as well as a straight line. Also, such pipings are usually made with a curved edge for the finished or exposed surface of the piping, thus a relatively thick strip or layer is provided which is not readily capable of being fitted to sharp curves, unless provided with notches, slots, slits or the like, to facilitate the bending.

Heretofore it has been customary to provide such piping and welting strips with a series of notches or slight cuts or slits, and while this would serve to enable the piping to be bent around ordinary curves and contours without wrinkling or puckering, it has never been capable of fitting snugly around sharp curved portions. In the manufacture of shoes, for example, it is now customary to fit a piping between layers of the upper, and hence it is most important that such piping should not wrinkle underneath the surface of the upper or between the edges of two parts of the upper which would render objectionable wrinkles in the exterior.

My present invention obviates prior difficulties and enables me to produce a piping with great flexibility capable of being flexed in a variety of ways, and either concave or convex widthwise of the strip constituting the piping, and to thus give great facility for use in sharp curves and between thin layers.

Also I am enabled to make my improved piping by an improved and simple process which will simultaneously cut a plurality of piping strips and effect the novel method of cutting, notching and slitting to any desired facility for bending.

In carrying out my invention I provide a piping with a series of notches cut as deeply as same may safely be formed in one side, and then I also provide a series of cuts or slits which may be safely extended much deeper than the notches could be formed—in fact, clear to the line of stitching, or beyond, without any objectionable result. This combined notched and slit edged piping gives greater facility for flexing and bending widthwise of the strip, both in a concave and convex direction, and both notches and slits may be cut simultaneously by a cutting wheel, or the like, as may be further explained in carrying out my present process and making the novel piping of my invention.

Referring to the drawing, illustrating the preferred embodiment:

Fig. 1 is a side view of a fragment of my improved piping;

Fig. 2 is a cross-sectional view on the line 2—2 of Fig. 1;

Fig. 3 shows the facility for bending in one direction;

Fig. 4 shows bending in the reverse direction;

Fig. 5 illustrates the attachment of the piping between two thin layers, such as shoe upper materials, and Fig. 6 illustrates the preferred method of carrying out my process.

As clearly shown in Figs. 1, 3, 4 and 5, the present invention includes a piping or welt strip designated at 1, of suitable width and preferably with an edge portion turned up at 2, to give a finished turned edge 3 for the desired appearance. Opposite to the edge 3 the piping is formed with a series of notches 4, 4, these notches preferably being cut slightly within that edge of the piping, but must not extend as far as the line of stitching 20, as shown in Fig. 5. In addition to these notches I add vertical slits or cuts 5, 5, preferably substantially centrally of the notched portions 4, which slits may be formed substantially longer than the depths of the cuts of the notches 4, as indicated at 6, 6, such deep cuts even extending to or below the line of stitching 20 without interfering with same.

When the piping is flexed in one direction, as shown in Fig. 3 with the finished curved edge 3 on the concave portion of the curve, the notches 4 and slits 5 will permit the same to spread and extend freely, without wrinkling, to a far greater degree than formerly possible with the notches alone, eliminating all danger of wrinkling. When the piping is flexed in a direction widthwise with the curved edge 3 on the convex side, the notches 4 and cuts 5 permit the welting to be compressed to a greater extent on the concave edge than would be otherwise possible and without wrinkling.

As illustrated in Fig. 5, the piping 1 is shown stitched between two layers 10 and 12 and around a curved portion, such for example the vamp, quarter, or foxing of a shoe upper, by stitching 20. This form of piping or welting is particularly important and desirable where the same is fitted between two layers and stitched by a single uniting line of thread because of the facility with which it lays flat and is fitted around relatively sharp curves or contours in either direction. Formerly, it was customary to stitch such welting to one surface to hold it and apply the other layer and unite same with a separate row of stitching, but since the invention of Mr. C. H. Sanborn, Serial No. 467,691, wherein a single line of stitching can be used to unite piping and two layers, it has become most important to have a welting which will cooperate therewith and facilitate the smooth laying of same between the layers with great facility for following bends, curves and contours.

In Fig. 6 is illustrated a preferred method of forming this welting, wherein a relatively wide strip 14 is cut into two welt strips, each having a turned edge 3 and the combined notched and slitted portions 4 and 5, by subjecting the wide strip 14 to a cutting roll 15, having appropriate cutting surfaces 17 and 18 to cut the notches 4 and slits 5 simultaneously on the inner edge portion of each strip 1, thus forming two such piping strips from the single double strip 14. This strip 14 is preferably formed by folding over each edge portion to give the finished turned edge 3, same being secured by an adhesive and to an extent substantially as shown in Fig. 2.

I believe that my present form of piping is a distinct novelty in this art and that the process of making same is novel and I wish to claim both these features broadly.

Having described my invention, I claim:

As an improved article of manufacture, piping, welting or the like, having a finished edge and having the opposite edge with a series of combined notches and slits, the slit cuts being of greater depth than that of the notches, said slits being intermediate the notches.

In testimony whereof, I have signed my name to this specification.

A. WALDO ROCKWOOD.